United States Patent [19]
Scriven

[11] 3,913,864
[45] Oct. 21, 1975

[54] HOLDER FOR FISHING LEADERS AND THE LIKE

[76] Inventor: George A. Scriven, 2597 Imola Ave., Napa, Calif. 94558

[22] Filed: June 28, 1974

[21] Appl. No.: 484,252

[52] U.S. Cl. ............. 242/125.2; 242/129; 242/137
[51] Int. Cl.² ................ B65H 75/28; B65H 49/00; B65H 49/18
[58] Field of Search .......... 242/125.2, 125, 118, 77, 242/85.1, 105, 137, 137.1, 129

[56] References Cited
UNITED STATES PATENTS

| | | | |
|---|---|---|---|
| 1,489,591 | 4/1924 | Catlett et al. | 242/129 |
| 1,516,331 | 11/1924 | Catlett et al. | 242/129 |
| 2,137,618 | 11/1938 | Krimmel | 242/118 |
| 2,936,963 | 5/1960 | Witte | 242/118 X |

*Primary Examiner*—Leonard D. Christian
*Attorney, Agent, or Firm*—Gordon Wood

[57] ABSTRACT

A holder for fishing leaders or similar lines adapted to be manufactured from inexpensive flexible plastic and including a base and a plurality of lugs around which the leaders or other line may be wound. The free ends of the lugs may be snapped under a rim formed on the base in order to hold the line against movement.

6 Claims, 3 Drawing Figures

U.S. Patent    Oct. 21, 1975    3,913,864
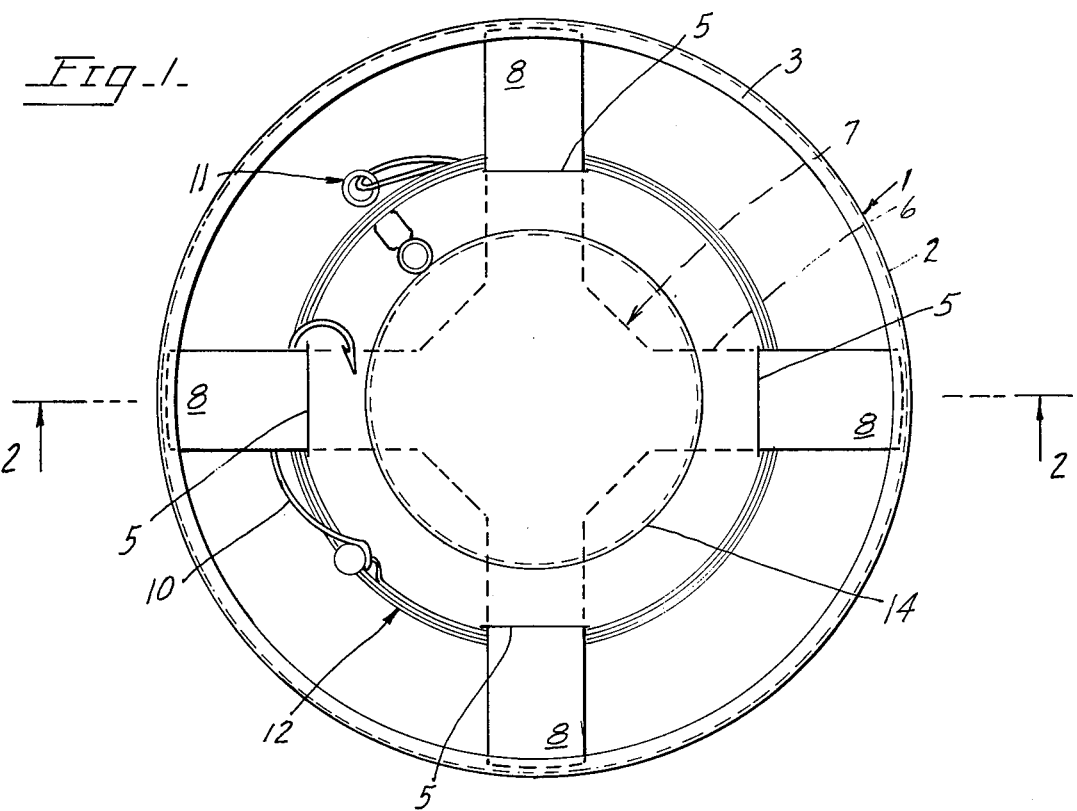
Fig. 1.
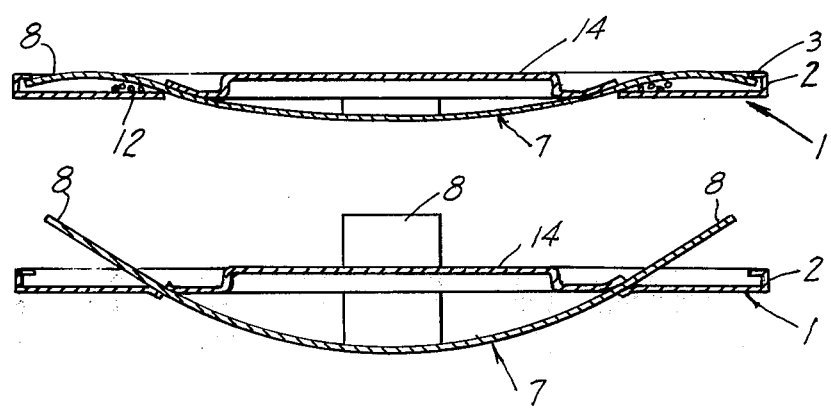
Fig. 2.
Fig. 3.

HOLDER FOR FISHING LEADERS AND THE LIKE

This invention relates to a holder for storing unwieldy lines such as fishing leaders which ordinarily tend to become snarled.

The main object of the present invention is the provision of an extremely inexpensive holder on which the line may be wound and which includes means for positively preventing shifting or unwinding of the line.

Other objects and advantages will be apparent from the following specification and from the drawings.

FIG. 1 is a top plan view of the line holder showing a typical leader line stored thereon.

FIG. 2 is a cross sectional view of the structure of FIG. 1.

FIG. 3 is a view similar to FIG. 2 but with the central flexible member deflected to permit winding of the line on the free ends thereof.

In the preferred form of the invention, a preferably circular base generally designated 1 is provided. Around the periphery of said base is a short side wall 2 and a radially inwardly projecting lip 3. The base 1 may be formed of relatively thin gauge resilient plastic and is provided with four slits 5 through which extend extensions 6 of a member generally designated 7 provided on the underside of base 1. Said extensions 6 terminate in lugs 8 which are adapted to be snapped under the rim 3 to the position shown in FIGS. 1 and 2 when the line 12 is in stored position.

As best seen in FIG. 3 the user may pull outwardly on the member 7 so that the extensions 6 and lugs 8 assume the position shown. In this position the hook 10 or the end loop of the leader line 12 may be hooked around one of the lugs 8 and the remainder of the line then wound about the four lugs as shown in FIG. 1. The end fitting generally designated 11 may then be tucked under the windings of the line to secure the assembly in place. Upon release of the member 7, the lugs 8 may then be snapped under the rim 3 to secure the line 12 against movement or snarling.

To facilitate the insertion of a person's fingers between the member 7 and the base 1, it is preferable that the latter be centrally offset to form a large diameter boss 14 thereby providing additional room for grasping the member 7 when the latter is to be deformed to the position of FIG. 3.

It will be apparent that the base need not necessarily be circular but may in fact be square. Furthermore, the rim 3 need not extend around the entire periphery but be present only at those portions of the base where the lugs 8 are positioned.

Although it would be possible to secure the lugs 8 integrally with the base to achieve some of the advantages of the invention, it is preferred to provide the member 7 which carries said lugs so as to simplify deflecting the lugs 8 outwardly to the position of FIG. 3 when it is desired to wind the line therearound.

I claim:

1. A holder for a length of line or the like comprising:
   a generally flat base,
   a plurality of lugs carried by said base and arranged in a circular row and projecting radially outwardly of said row to form a reel around which said line may be wound,
   means formed on said base engageable with the free end of at least one of said lugs for holding such free end against movement at right angles to said base.

2. A holder according to claim 1 wherein said lugs are of resilient material and said means comprises a radially inwardly projecting lip on said base, said free ends being adapted to be received under said lip.

3. A holder according to claim 1 wherein a planar member is provided on the opposite side of said base from said lugs, said lugs constituting coplanar ends of extensions of said member, and said base being formed with openings through which said extensions extend.

4. A holder for a length of line or the like comprising:
   a generally flat base,
   a plurality of lugs carried by said base and arranged in a circular row and projecting radially outwardly of said row to form a reel around which said line may be wound,
   a planar member on the opposite side of said base from said lugs, said lugs constituting coplanar ends of extensions of said member, said base being formed with openings through which said extensions slidably extend.

5. A holder according to claim 4 wherein said extensions are formed of resilient material to permit said member to be pulled away from said base against the resiliency of said extensions whereby said extensions are bent and said lugs deflect away from said base to facilitate winding said line on said lugs.

6. A holder according to claim 4 wherein said base is provided with a radially inwardly projecting lip adapted to receive the free end of one of said lugs thereunder.

* * * * *